Patented Mar. 11, 1952

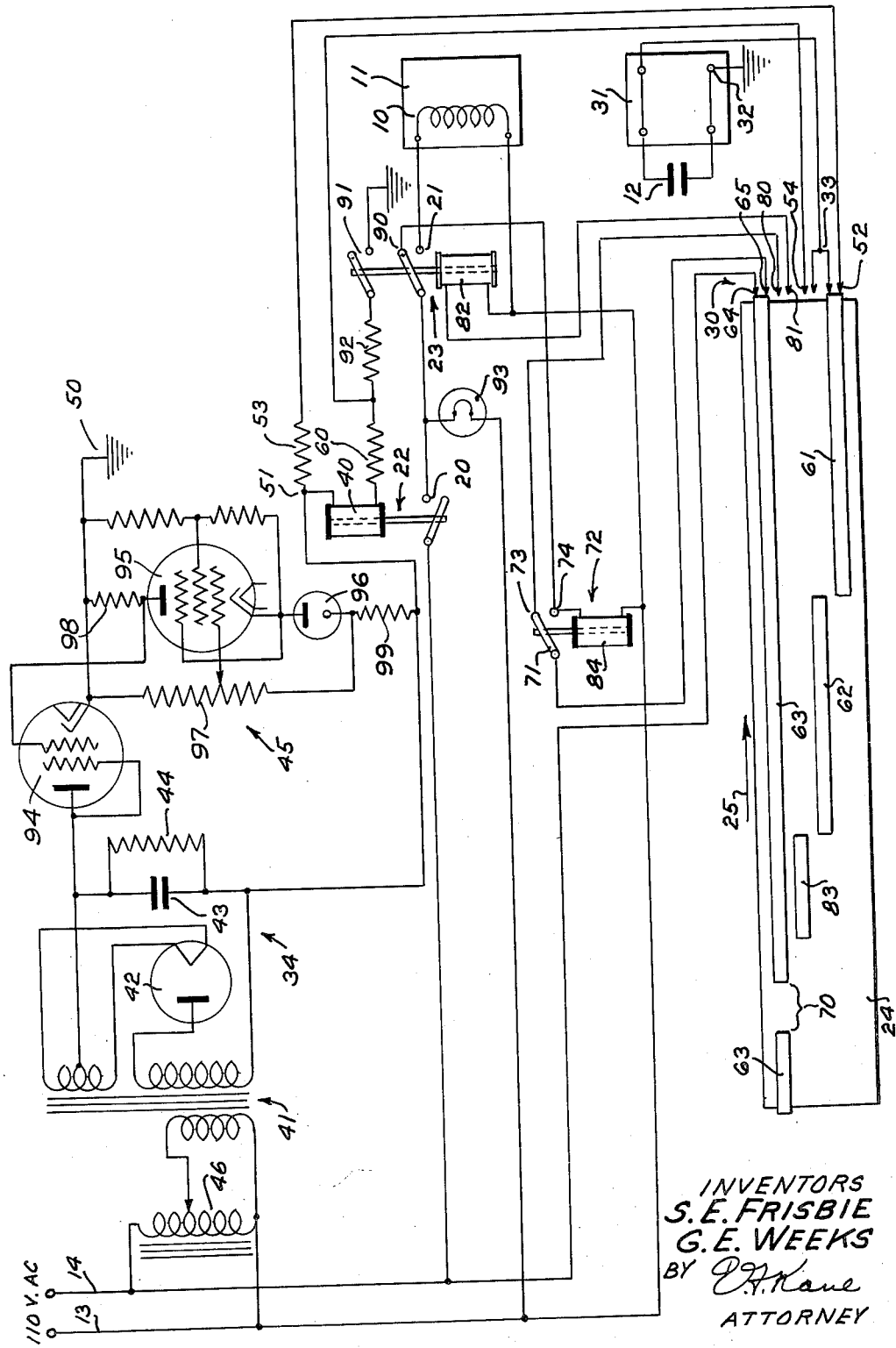

2,589,070

UNITED STATES PATENT OFFICE 2,589,070

ELECTRICAL BREAKDOWN TESTING APPARATUS

Stewart E. Frisbie, Danville, and Gilbert E. Weeks, Chicago, Ill., assignors, by direct and mesne assignments, to Western Electric Company, Incorporated, New York, N. Y., a corporation of New York Application August 30, 1948, Serial No. 46,792

5 Claims. (Cl. 209—81)

1

This invention relates to electrical breakdown testing apparatus and more particularly to an apparatus for testing condensers for electrical breakdown.

An object of this invention is to provide a new and efficient apparatus for testing articles for electrical breakdown.

In accordance with one embodiment of this invention a condenser testing apparatus is provided wherein a condenser is subjected to a high voltage for a predetermined time interval, and if no breakdown occurs, a pair of successive relays operate in response to a timing switch, thereby completing an acceptance circuit through the contacts of the operated relays. However, if the condenser breaks down, current flow through the condenser will cause one of the above relays to operate a third relay to open the circuit to the timing switch rendering the timing switch, when operated, ineffective to close the circuit to one of the relays necessary to complete the acceptance circuit. The acceptance circuit may be used to operate an indicator or a device for separating good condensers from bad ones.

In the embodiment of the invention described herein the object of the test is to energize the operating coil 10 of an acceptance device 11 if the condenser 12, under test, successfully withstands a predetermined high voltage impressed across it. In case the condenser under test should break down during the test then the operating coil 10 is to remain deenergized. The acceptance device 11 may be an indicator or it may be a mechanical device of any known type for causing the separation of good condensers from bad ones. When energized the operating coil 10 receives its operating current from electrical supply lines 13 and 14 through closed contacts 20 and 21 of relays 22 and 23, respectively, the relays being adapted to operate contemporaneously only if the condenser successfully passes the test.

The various timed connections between parts of the circuit may be effected by means of a commutator 24 moveable in the direction of the arrow 25, and having a plurality of contact segments engageable with contact brushes at the brush station 30. The commutator 24 may be a drum or a moveable flat strip, the rotating or moving means not being shown in the drawing.

The condenser 12 may be placed in a test fixture 31 which supports the condenser and connects it to ground at 32 and to the testing apparatus through a brush 33 during fixed time intervals.

The apparatus is provided with a regulated uni-directional high voltage power supply 34 for impressing the test voltage across condenser 12 first directly and later indirectly through the operating coil 40 of the breakdown relay 22. Although any suitable power supply may be used, the one shown includes a transformer 41, a half-wave rectifier 42, a filter condenser 43, a bleeder resistor 44 and a regulating section 45. The regulating section 45 consists of a pair of grid controlled electronic tubes 94 and 95 and a gas-filled voltage regulator tube 96 which serves to hold the cathode of tube 95 at a constant potential. The regulating action is afforded by means of a potentiometer 97 and two resistors 98 and 99 in a conventional regulating circuit. A typical phase in the operation of the regulating section 45 is as follows: Assuming that the output voltage across the tube 94 is too high, the voltage drop across the potentiometer 97 will increase, thus making the control grid of tube 95 more positive with respect to its cathode. Therefore, tube 95 will conduct more current which, in turn, causes a greater voltage drop across resistor 98. This drives the control grid of tube 94 more negative with respect to its cathode, thus increasing the resistance of tube 94 and bringing the voltage back to the desired value. It is to be understood that the regulating section 45 forms no part of the invention and any suitable well-regulated D. C. voltage may be used as a test voltage in the testing of condensers according to the invention. Power for the transformer 41 is obtained from a variable auto-transformer 46 connected to the electrical supply lines 13 and 14.

One side of the power supply output is grounded at 50 while the other side appears at 51, which point is connected to the upper end of the relay coil 40 and also to a commutator brush 52 through a current limiting resistor 53. Another commutator brush 54 is connected to the lower end of the relay coil 40 through a resistor 60.

The brushes 33, 52 and 54 are so arranged that as commutator 24 moves in the direction of the arrow 25, a commutator contact segment 61 is engaged simultaneously by brushes 33 and 52, thereby connecting the condenser 12 to the high voltage output at 51 until the segment 61 completely passes the brush station, after which another contact segment 62 is engaged by brushes 33 and 54 to connect the condenser 12 to the power supply at 51 through the resistor 60 and the relay coil 40. It will be seen from the drawing that another contact segment 63 is, with the exception of a short gap denoted by 70, in continuous engagement with a pair of brushes 64 and 65, which engagement closes a circuit between the supply line 14 and the contact arm 71 of a relay 72. The relay 72 is provided with contacts 73 and 74, and when the relay is unoperated the circuit is broken at 74 and closed at 73.

Still another pair of contact brushes 80 and 81 are provided to close a circuit from the relay contacts 73 to the upper end of the operating coil 82 of the relay 23 when the commutator 24 carries a contact segment 83 to the brush station and into engagement with the brushes 80 and 81. The relay 72 is provided with an operating coil 84 whose upper end is connected to the relay contacts 74 and to a normally closed break contact 90 on the relay 23. At their lower ends the operating coils 82 and 84 of the relays 23 and 72, respectively, are connected to the supply line 13. In addition to contacts 21 and 90, relay 23 is provided with a normally open make contact 91 which when closed connects ground through a resistor 92 and the resistor 60 to the lower end of the operating coil 40 of the relay 22. A signal lamp 93 is lighted when the relay contacts 20 of the relay 22 are closed.

In carrying out the test, condenser 12 is connected to the test fixture 31, and the commutator 24 is set in motion to move in the direction of the arrow 25. The particular position of the commutator segments with respect to the brush station 30, shown in the drawing, is the position of the commutator at the beginning of the test. While the brushes 64 and 65 are in almost continuous contact with the commutator segment 63, the brushes 33 and 52 have just been engaged by the commutator segment 61, thereby impressing across the condenser 12 the high test voltage from the power supply at 50 and 51. This test voltage is maintained for the time interval during which the commutator segment 61 remains in contact with the brushes 33 and 52. As the left end of the segment 61 passes the brush station 30, brushes 33 and 54 are engaged by the commutator segment 62 and brushes 33 and 52 are disengaged by segment 61. This changes the path of the high test voltage from the power supply to the condenser 12. Instead of taking the path through the resistor 53, the test voltage from the power supply output at 51 is impressed across the condenser 12 through the relay coil 40 and current limiting resistor 60.

If, in the meantime, the condenser was able to withstand the high test voltage, there would be no appreciable current flow through the condenser and nothing would happen until the commutator segment 83 would have reached the brush station 30 to engage the brushes 80 and 81, thereby completing the circuit from the supply lines 13 and 14 to the operating coil 82 of the relay 23; the electrical path being from the supply line 13 to the lower end of the operating coil 82, from the upper end of the operating coil throuhg the brush 81, the segment 83, the brush 80, the contact 73, the contact arm 71, the brush 65, the commutator segment 63, and the brush 64 to the supply line 14. Current from the supply lines 13 and 14 then energizes the coil 82 to operate the relay 23 and open the contact 90 while closing the contacts 91 and 21.

Closure of contact 21 connects the upper end of the operating coil 10 to the relay contact 20 of the relay 22 and closure of the contact 91 connects the lower end of the relay operating coil 40 to ground through the resistor 92, thereby operating the relay 22 and closing the contact 20 which completes the electrical circuit from the supply lines 13 and 14 to the operating coil 19 of the acceptance device 11, this being the result sought for in the case of a good condenser.

Normally the resistor 92 would not be required since the relay 22 would operate upon closure of contacts 91 if thereby ground would be connected directly to the operating coil 40 through the resistor 60. The resistor 92 is inserted as a calibrating resistor to provide a means for automatically checking portions of the circuit every time contacts 91 are closed. The resistor 92, if chosen correctly, will permit a check with respect to possible failure or incorrect test voltage of the power supply 34 and also with regard to the calibration of the relay 22 for correct current operating point. The resistance value of resistor 92 should be the highest unacceptable resistance in the condensers to be tested. For example, if the relay 22 is arranged to operate on the value of current through the condenser 12 caused by a breakdown resulting in a reduction of the series resistance of the condenser to 300,000 ohms, and not to operate if the condenser resistance is over 400,000 ohms, then the value of the resistor 92 may be on the order of 300,000 ohms. It will be apparent that if the relay 22 fails to operate after the contacts 91 have closed, either the power supply has failed to deliver the proper test voltage or the relay 22 is out of order to the extent that it will not operate at any value of current or it will operate only at a value of current too high to show up a condenser whose resistance has dropped to 300,000 ohms but not below that figure.

If during the initial part of the test the condenser 12 had suffered an electrical breakdown by the time the commutator segment 62 was engaged by the brushes 33 and 54, the current flow through the condenser 12 would also flow through the operating coil 40 of the relay 22 and operate the relay to close the contact 20, thereby completing a circuit from the supply lines 13 and 14 to the operating coil 84 of the relay 72 through the closed contacts 90 of the unoperated relay 23. Relay 72 is thereby operated to break the circuit at the contact 73 and to close the circuit at contact 74 thus locking the relay 72, and the circuit being opened at 73, the commutator segment 83 will be ineffective to close the circuit from the supply lines 13 and 14 to the operating coil 82 of the relay 23 when the segment 83 reaches the brush station 30. Since the relay 23 remains unoperated at the end of the test, the circuit to the operating coil 10 will remain broken at the contacts 21 thus preventing the operating coil 10 from receiving energizing current from the supply lines 13 and 14. As was pointed out before, the fact that the coil 10 remians unenergized at the end of the test is the indication that the condenser 12 is bad.

The apparatus is reset by a break in the circuit between the brushes 64 and 65 when the gap 70 in the continuity of the segment 63 reaches the brush station 30. This disconnects the supply line 14 from the locked relay 72, thereby releasing the relay and returning the apparatus to normal.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing condensers for electrical breakdown, which comprises a source of test voltage, a first timed switching means for connecting said source to a condenser under test for a first time interval, a first relay having a coil and a normally open contact, a second timed switching means operable at the expiration of the first time interval for connecting said source through the coil of said first relay and through said condenser for a second time interval, a second relay having a coil, a normally closed contact and a normally open holding contact, a third relay having a coil in series with the closed contact of the second relay, a normally closed contact in series with the contact of the first relay and the second relay coil, a first normally open contact and a second normally open contact, a third timed switching means operable after the expiration of the second interval for connecting the third relay coil to the normally closed contact of the second relay, a calibrating resistor having a predetermined value, the second relay being operable in response to the closing of the normally open contact of the first relay when the third relay is unoperated, the third relay being operable in response to operation of said third timed switching means when the second relay is unoperated, the first relay being operable in response to current flow through the condenser if its resistance is at or below said predetermined value and also being operable through said calibrating resistor in response to the closing of the second normally open contact of the third relay, and an electromagnetic acceptance device operable from a normal rejecting position in response to the contemporaneous closing of the normally open contact of the first relay and the first normally open contact of the third relay to accept the condenser under test.

2. In an apparatus for testing condensers for electrical breakdown, the combination including a first relay having a coil and a normally open contact, a second relay having a coil, a normally open holding contact and a normally closed contact, a normally operative electromagnetic separating device energizable to a non-separating position by the contemporaneous closing of the first and second normally open contacts, a source of test voltage, a timing switch for connecting said test voltage directly across a condenser under test for a first time interval, a second timing switch for connecting the first relay coil in series with said test voltage and said condenser for a second time interval at the expiration of said first time interval, a third relay having a coil in series with the normally closed contact of the second relay, a normally open contact and a normally closed contact in series with the coil and the normally open contact of the second relay, the third relay also being provided with a second normally open holding contact in parallel with the first relay contact, said second relay being energizable in response to closure of the normally open contact of the first relay during the second time interval to break the circuit to the coil of the third relay and to close the holding contact, thus preventing energization of the third relay, a third timed switching means effective upon non-operation of said first and second relays at the end of said second time interval to energize said third relay coil to close the normally open contact of the second relay, and an auxiliary circuit closable by the operation of said third relay to energize said first relay to close the normally open contacts thereof, thus energizing said separating device.

3. In an apparatus for testing condensers for electrical breakdown, the combination including a first relay having a coil and normally open contacts, a second relay having a coil, normally open operating contacts in series with the first relay contacts, normally closed contacts in series with the first relay contacts and normally open calibrating contacts in series with the first relay coil, a normally operative electromagnetic separating device energizable to a non-separating position by the contemporaneous closing of a first relay contact and the second relay operating contacts, a source of test voltage, a timing switch for connecting a condenser directly across the test voltage for a first time interval, a second timing switch for connecting said first relay coil in series with said test voltage and said condenser for a second time interval at the expiration of said first time interval, a third relay having a coil in series with the normally closed contacts of said second relay, said third relay also having normally open holding contacts in parallel with the normally closed contacts of the second relay and also being provided with normally closed contacts in series with the second relay coil, said third relay coil being energizable in response to closure of the contacts of said first relay during the second time interval to break the circuit to said second relay coil at the normally closed contacts of said third relay and lock said third relay through the normally open holding contacts thereof, thus rendering closure of the normally open operating contacts of the second relay to energize said separating device impossible, a calibrating resistor in series with the first relay coil and the second relay calibrating contacts, and a third timing switch effective upon non-operation of said first and third relays at the end of said second time interval to energize said second relay coil.

4. In an apparatus for testing condensers for electrical breakdown, the combination including a first relay having a coil and normally open contacts, a second relay having a coil, normally open operating contacts in series with said first relay contacts, normally closed contacts in series with said first relay contacts and normally open actuating contacts in series with the first relay coil, an electromagnetic separating device energizable by the contemporaneous closing of the first relay contacts and the operating contacts of the second relay, a source of test voltage, commutating means for connecting said test voltage directly across a condenser under test for a first time interval to charge the condenser, second commutating means for connecting said first relay coil in series with said test voltage and said condenser for a second time interval beginning at the expiration of said first time interval, a third relay having a coil in series with the normally closed contacts of the second relay, normally open holding contacts in series with the first relay contacts and the normally closed contacts of the second relay and normally closed contacts in series with the second relay coil, said third relay being energizable in response to closure of the contacts of said first relay during the second time interval to break the circuit to said second relay coil at the normally closed contacts on said third relay and lock in said third relay through the normally open holding contacts thereon, thus rendering closure of the operating contacts of the second relay to energize said separating device impossible, third commutating means effective for a third time interval upon non-operation of said first and third relays at the end of said second time interval to energize said second relay coil to close said second relay operating contacts, an auxiliary circuit closable by closure of the actuating contacts to energize said first relay coil to close said first relay contacts, thus energizing said separating device, and fourth commutating means in series with the holding contacts conductive throughout said first three time intervals and non-conductive for a fourth time interval thereafter for resetting the apparatus.

5. In an apparatus for testing condensers for electrical breakdown, the combination including a test relay having a coil and a pair of normally open contacts, an operating relay having a coil, a pair of normally open operating contacts in series with the test relay contacts, a pair of normally closed contacts in series with the test relay contacts and a pair of normally open calibrating contacts in series with test relay coil, a normally operative electromagnetic separating device energizable to a non-separating position by the contemporaneous closing of test relay contacts and the operating contacts, a source of test voltage, commutating means connecting said test voltage directly across a condenser under test for a first time interval, second commutating means connecting said test relay coil in series with said test voltage and said condenser for a second time interval at the expiration of said first time interval, a blocking relay having a coil in series with the normally closed contacts on said operating relay and energizable in response to closure of the test relay contacts during the second time interval, said blocking relay also being provided with a pair of normally open holding contacts and a pair of normally closed blocking contacts in series with the operating relay coil, a calibrating resistor connected in series with the test relay coil and the calibrating contacts, third commutating means in series with the blocking contacts and the operating relay coil conductive for a third time interval upon non-operation of said test and blocking relays at the end of said second time interval to energize said operating relay coil to close said pair of normally open operating contacts, an auxiliary circuit closable by operation of said operating relay to energize said test relay coil through said calibrating resistor to close the test relay contacts, thus energizing said separating device, and a fourth commutating means continuous throughout said first three time intervals and discontinuous for a fourth time interval thereafter, said discontinuous portion being effective to break the locking circuit to said third relay, thus returning the apparatus to starting position.

STEWART E. FRISBIE.
GILBERT E. WEEKS.

REFERENCES CITED

The following references are of record in the file of this patent:

UNITED STATES PATENTS

| Number | Name | Date |
|---|---|---|
| 1,768,449 | Heiny | June 24, 1930 |
| 1,853,639 | Robinson | Apr. 12, 1932 |
| 2,362,691 | Gaiser | Nov. 14, 1944 |